May 22, 1951 S. W. LICHTMAN ET AL 2,553,594

PULSE FREQUENCY MONITOR

Filed Feb. 28, 1949 2 Sheets-Sheet 1

INVENTORS
SAMUEL W. LICHTMAN
DANIEL G. MAZUR

BY M. O. Hayes

ATTORNEY

PULSE FREQUENCY MONITOR

Filed Feb. 28, 1949 2 Sheets-Sheet 2

INVENTORS
SAMUEL W. LICHTMAN
DANIEL G. MAZUR
BY M. A. Hayes
ATTORNEY

Patented May 22, 1951

2,553,594

UNITED STATES PATENT OFFICE 2,553,594

PULSE FREQUENCY MONITOR

Samuel W. Lichtman and Daniel G. Mazur, Washington, D. C.

Application February 28, 1949, Serial No. 78,882

6 Claims. (Cl. 177—311)

Figure 1:
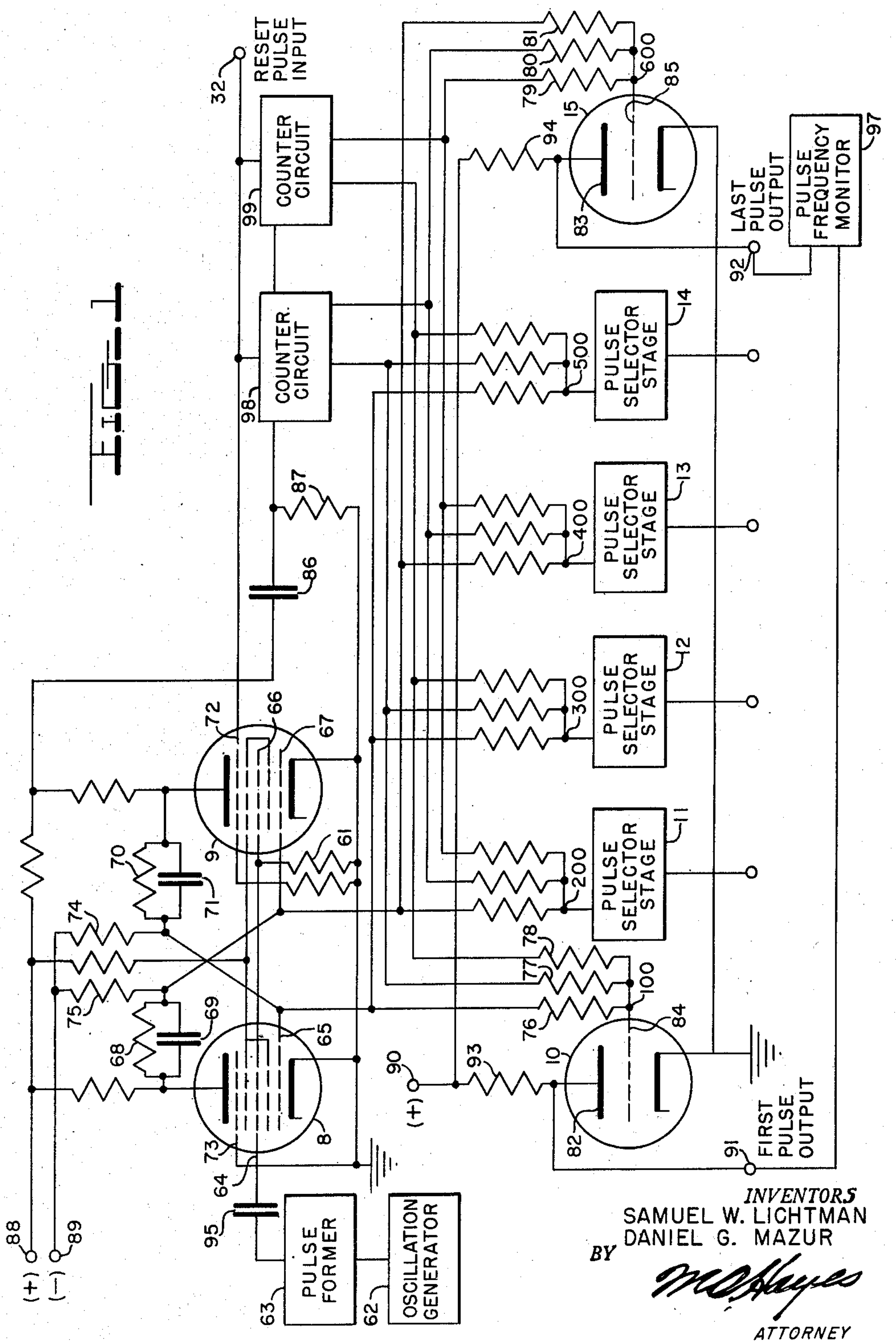

(Granted under the act of March 3, 1883, as amended April 30, 1928; 370 O. G. 757)

The present invention relates in general to a pulse frequency monitor for a cascaded counter circuit wherein the counter circuit is periodically reset by a synchronizing pulse and in particular the invention relates to apparatus for determining whether the frequency of the signal source driving the counter circuit is in accordance with a particular harmonic order of the synchronizing pulse.

Examples of counter circuits in which the present invention finds application are disclosed in U. S. patent to Smith et al., No. 2,409,229, the co-pending application of Krause et al., Serial No. 593,174, filed May 11, 1945, and in our co-pending application Serial No. 67,904, filed December 29, 1948.

As a particular illustration of the utility of the present invention reference is made of our aforementioned co-pending application wherein there is disclosed a pulse multiplex communication system, for the transmission and reception of a recurrent series of time modulated pulses. Each pulse of the series is representative of a different intelligence channel and its time occurrence with respect to a reference pulse is modulated in accordance with the intelligence it represents.

The pulse multiplex receiving apparatus of the system includes an oscillation generator and a cascaded counter chain driven by the oscillation generator. The counter chain at the receiver is designed to have a different state for each intelligence quantity being transmitted and the oscillator which drives the counter is adjusted in frequency to change the state of the counter in synchronism with the transmission of the several channel pulses. And finally, each time the counter chain changes states a timing circuit or other device is operated to time the occurrence of the channel intelligence pulse.

Since the intelligence pulses are transmitted cyclically, the counter chain must start from the zero state at the commencement of each cycle of transmission. This action is accomplished by applying a periodic reset or synchronizing pulse to each scale-of-two counters in the counter chain. The reset pulse returns the counter chain to a zero state and thus permits the oscillation generator to sequentially trigger the counter circuits in the proper order and time sequence as to correspond in time to the channels of transmission.

Through the use of the reset pulse there is provided a reference point, zero state of the counter, from which the present invention, the pulse frequency monitor may be incorporated.

If the frequency of the oscillation generator (counter drive source) is lower than the desired operating frequency the number of drive pulses applied to the counter circuits between synchronizing pulses will accordingly be less than the desired number and similarly the number of states through the counter is driven will be less than the number of channels of transmission. If the frequency of the oscillation generator (counter drive source) is high the number of drive pulses applied to the counter circuits between synchronizing pulses will accordingly be higher than the desired number, and in a like manner the number of states through which the counter is driven will be higher than the number of channels of transmission.

It is accordingly an object of the present invention to provide a simple and yet efficient device for checking the accuracy of the counter drive source incorporated in our aformentioned application Serial No. 67,904, filed December 29, 1948.

It is a further object of the present invention to provide a means for determining whether a given number of pulses occur in a fixed time interval.

Another object of the present invention is to provide a means for determining the presence or absence of a single pulse.

Another object of the present invention is to provide a means for determining presence of one or more than one pulse.

Figure 2:
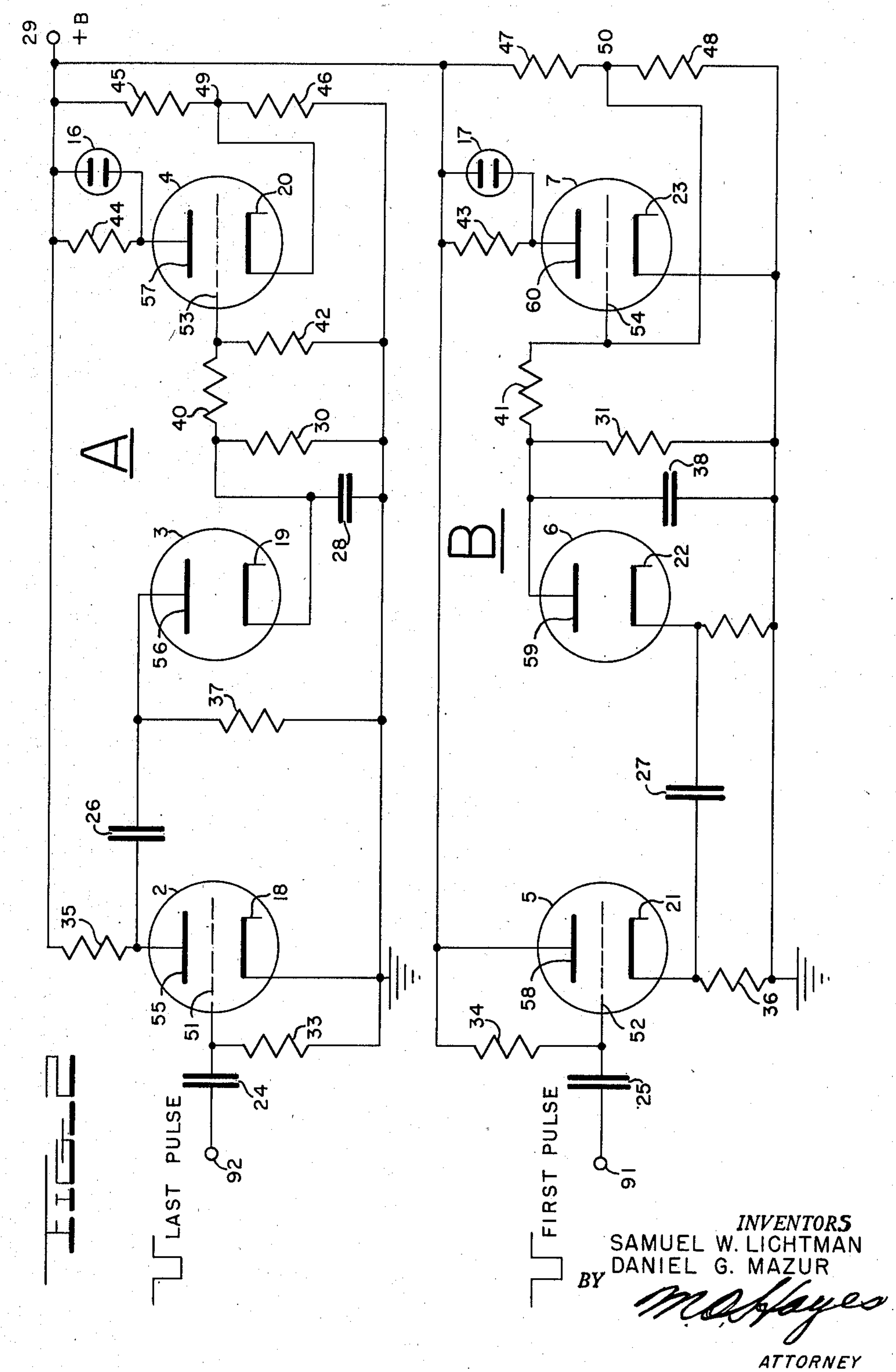

Further and other objects and attainments of the present invention will become apparent upon a careful consideration of the following detailed description when taken in conjunction with the drawings in which:

Fig. 1 is a schematic diagram of a counter circuit useable in the present invention, and Fig. 2 is a schematic diagram of a typical embodiment of the present invention.

The present invention is best explained in conjunction with a cascaded counter circuit such as disclosed in the aforementioned patent to C. H. Smith et al., incorporating the modified embodiments as disclosed in our co-pending application, supra. It is to be understood, however, that the specific embodiment of the present invention is not to be limited to the counter circuits described, moreover, the present invention may be incorporated in any system wherein a series of pulses are derived from an oscillation generator, and which series of pulses are periodically reset by a reference pulse.

With particular reference to Fig. 1 a detailed circuit diagram of the patent to C. H. Smith et al., incorporating the modification from our co-pending application, is shown. As indicated in the figure, the time base generator comprises an oscillation generator 62, a pulse former 63 arranged to drive a typical counter chain which includes a series of scale-of-two counter stages connected in cascade. The first counter stage comprises two electron tubes 8 and 9. Counter stages 98 and 99 are of similar design. Therefore for purposes of simplification, only the first counter stage is illustrated in detail. Tubes 10 and 15 and blocks 11 through 14 represent the pulse selector tubes with which the time base generator is to operate. The oscillation generator 62 and pulse former 63 may be of any suitable pulse-generating device, such as that shown in our aforementioned co-pending patent application. The primary function of this pulse generator is to provide a source for driving the counter chain through a complete cycle of operation. By interconnection of the control grid of each of the selector tubes to predetermined points in the counter chain, as hereinafter described in detail, the counter circuit is made to successively render each of the selector tubes conducting, during a cycle of operation.

In each scale-of-two counter stage the first control grid 65 of the first tube 8 is connected through the shunt combination of resistance 70 and capacitance 71 to the plate of the second tube 9 and also, through the grid return resistance 74 to a source of C— potential 89. Likewise, the first control grid 67 of the second tube 9 is connected through the shunt combination of resistance 68 and capacitance 69 to the plate of the second tube 8 and also, through the grid return resistance 75 to a source of C— potential 89. The circuit is thus made regenerative and only one of the tubes will conduct at any instant. To change the conduction condition of either tube a negative signal is applied in parallel to the second control grids 64 and 66 of both tubes. As the conduction state of the circuit changes, the first control grid of the tube passing from conduction to nonconduction will vary from about zero potential to a negative potential determined by the voltage divider action from the positive potential at the plate of the second tube 9 to the negative supply potential across resistances 74, 70.

The input to the counter circuit, as obtained from the pulse former 63, is applied in parallel to the control grids 64 and 66 through a coupling circuit comprising capacitance 95 and resistance 61. In one case this circuit may constitute a short time-constant compared to the time duration of the applied pulse and therefore function to produce an abrupt positive pulse in response to the positive-going edge of each of the applied pulses and an abrupt negative pulse in response to the negative-going edge of each of the applied pulses. The input to the second counter circuit, not illustrated, is taken from a tap on the plate load resistance of the second tube 9 and is applied in parallel through a second short-time-constant circuit capacitance 86 and resistance 87 to the second control grids of the second counter stage. This manner of connecting the counters in cascade is followed through each stage in the series. The quiescent or zero state for the counter chain exists when tube 8 and all similar tubes in the succeeding counter stages are nonconducting.

In the selector circuit the control grid of each tube in the series is connected to a separate junction point 100, 200, and so on. Each of these junction points is in turn connected through separate resistances to the first control grid of the tubes in the counter circuits. This connection is typified at the first junction point 100 by resistances 76, 77 and 78. In this relation it should be noted that all the resistances at each junction point are equal in size and are current limiting in function. At the first junction point 100 current limiting resistances 76 is connected to the first control grid 65 of tube 8, resistance 77 to the first control grid of the second counter circuit and resistance 78 to the first control grid in the third counter circuit. As above mentioned, the first control grid of any tube in the counter circuit varies from zero potential to a potential determined by voltage division across resistances 74, 70 as that tube passes from conduction to nonconduction. Thus, when the counter is in the zero or quiescent state wherein the tube 8 and the similar tubes in stages 98 and 99 are conducting, the potential at the junction point 100 will be zero and the selector tube 10 will conduct since its cathode is returned directly to ground.

In our previously mentioned co-pending application there is described a simplified modification eliminating the coincidence tube as described in the C. H. Smith et al. patent. In our co-pending embodiment each pulse selector stage, such as typified at 10 and 15, is provided with a separate plate resistor 93 and 94, which permits the taking of an output pulse from each stage at points 91 and 92, respectively.

There is further provided in the operation of the series of counter stages as disclosed in our co-pending application a means for cyclically returning each stage to its zereo or quiescent state. This is accomplished by injecting the synchronizing pulse received from the transmitter, over reset pulse input point 32, to the suppressor grid 72 of tube 9. This reset pulse is similarly applied to each stage of the cascaded counter. The reset pulse being of a negative polarity renders tube 9 and similar tubes in stages 98 and 99 nonconducting and hence tube 8 conducting, permitting the counter to repeat its cycle of operation.

Through the use of the reset pulse there is provided a reference point from which our present invention, the pulse frequency monitor 97 as hereinafter described, may be incorporated. In brief and in accordance with the spirit of our invention the operation of the pulse frequency monitor, for determining the accuracy of the pulse source driving the counter circuit is predicated on the fact that a predetermined number of counter pulses must occur during each synchronizing reset pulse interval. The predetermined number of counter pulses of course is dependent on the number of pulse channels of transmission. As an example, assume for purposes of illustration that there are six channels of time modulated pulses transmitted as illustrated in Fig. 1. There is incorporated in the receiving system a scale-of-six counter circuit for reestablishing pulses, in accordance with the teachings of the aforementioned co-pending application, of a time period analogous to the time period of each channel of transmission.

It is seen then that there must be between two successive synchronizing pulses, if there are six channels of transmission, six drive pulses and hence six pulses from the pulse selector tubes to properly establish the time period of each channel. If the frequency of the oscillation generator is higher than its proper operating frequency there will accordingly occur at the output of the counter circuit more than the six timing pulses between the two successive synchronizing pulse intervals. In a similar manner if the oscillation generator frequency is lower than its proper operating frequency there will occur at the output of the counter circuit less than the six timing pulses. The counter circuits, being driven by pulses from the oscillation generator, will thusly produce at the output therefrom a number of pulses in accordance with the number of pulses formed from the oscillation generator output.

The theory of operation of the present invention is therefore based on the fact that if the oscillation generator is of the same frequency as the transmitter oscillator and there are six pulse channels of transmission there will be six pulses in the interval between two synchronizing pulses. The present invention is a means for quickly determining the frequency accuracy of the oscillator generator and therefore serves as guides in timing the oscillator. It will also be recognized that the present invention may be employed in determining the frequency of the oscillation generator independent of the counter circuits, wherein a reference point such as a synchronizing pulse is provided.

When the frequency of the oscillation generator is low, the synchronizing pulse will reset the counter before the last state in the counter is reached. The present invention provides means for determining the presence or absence of the last counter pulse of the series for determining whether the drive frequency is correct or low. When the frequency of the oscillation generator is high the synchronizing pulse will reset the counter after the first counter state has been reached for the second time in the normal transmission period. The present invention provides means for determining whether more than one pulse is produced from the first stage in the counter in a given time interval.

Referring in particular to Fig. 2 there is shown a preferred embodiment of the present invention which comprises a first series of electron tubes A capable of determining the presence or absence of a single pulse from the last counter stage and second series of electron tubes B capable of distinguishing between one and more than one pulse from the first counter stage.

In operation of the first series of electron tubes A, the last counter pulse which would normally immediately precede the synchronizing reset pulse, is applied as a negative pulse from terminal 92 through coupling capacitor 24 to grid 51 of tube 2. Vacuum tube 2 and its associated circuit is operative to invert the negative input pulse applied at terminal 92 to a positive pulse. Vacuum tube inverter 2 is operable in a conventional manner with plate resistor 35 tied to a point of positive potential 29, grid 51 grounded through resistor 33 and its cathode 18 tied directly to ground. The positive pulse from inverter 2 is fed through coupling capacitor 26 to anode 56 of vacuum tube 3. The output of vacuum tube 3 feeds an integrator operable in a conventional manner for integrating the positive pulse from vacuum tube circuit 2. The integrated pulse from the output of cathode 19 is smoothed through capacitor 28 and resistor 30 to give a smooth direct current voltage of a positive polarity.

The smooth direct current voltage of a positive polarity is then applied to grid 53 of vacuum tube 4. Vacuum tube 4 is normally negatively biased with respect to cathode to nonconduction. Cathode 20 being connected to the center point 49 of resistors 45 and 46 between B+ and ground, and grid 53 being connected to ground through resistor 42. The direct current voltage derived from the last counter pulse applied to grid 53 is of sufficient positive polarity to overcome the bias applied to vacuum tube 4 to render it operative. A neon bulb 16, or other suitable indicating means such as a meter, connected across resistor 44 in the plate circuit 57 of vacuum tube 4 will thusly indicate the conduction of the tube and hence the presence of the last counter pulse.

In operation of the second series of electron tubes B, the first counter pulse, the pulse which normally immediately follows the synchronizing reset pulse, is applied as a negative pulse from terminal 91 through coupling capacitor 25 to grid 52 of vacuum tube 5. Vacuum tube 5 is connected as a cathode follower operable in a conventional manner for matching the impedance of the input circuit. Its anode 58 is tied directly to the point of positive potential 29, and cathode 21 tied to ground through resistor 36. The output taken from cathode 21 of vacuum tube 5 is applied, through coupling capacitor 27 to cathode 22 of vacuum tube 6. Vacuum tube 6 feeds an integrator circuit operable in a conventional manner for converting the negative incoming pulse to a negative direct current voltage. This negative voltage is then smoothed through capacitor 38 and resistor 31 and applied to grid 54 of vacuum tube 7.

The grid 54 of vacuum tube 7 is biased, from point 50 of resistors 47 and 48 between the point of positive potential 29 and ground, in such a manner that a single pulse from terminal 91 is of insufficient negative voltage to render vacuum tube 7 nonconductive. However, if more than one pulse is received during its normal time period, vacuum tube 7 is biased to cut-off by having a negative voltage applied to grid 54 greater than the positive bias voltage applied thereto. It is seen then that the vacuum tube 7 continues to operate only upon the occurrence of a single pulse. A neon tube 17, or a similar device, connected across resistor 43 in the plate circuit 60 of vacuum tube 7 indicates the operation of the tube and hence the presence of one or more than one pulse.

In summary, if the counter drive source is of the proper frequency both neon bulbs 16 and 17 will be ignited. If the counter drive source is low in frequency then bulb 16 will be extinguished and bulb 17 ignited, and finally if the counter drive source is high in frequency bulb 16 will be ignited and bulb 17 extinguished.

Although we have shown certain and specific embodiments of the present invention, it is to be expressly understood that many modifications are possible thereof.

The invention described herein may be manufactured and used by or for the Government of the United States of America for governmental purposes without the payment of any royalties thereon or therefor.

What is claimed is:

1. The combination with a recurrent signal source of a plurality of scale-of-two counter circuits connected in a cascaded chain and fed by said source, means operative to reset said counter chain to a reference state at regular intervals large in comparison to the recurrence rate of said source, means including an integrator fed by the first stage in said chain operative to produce direct potential output which varies in amplitude dependency upon the number of changes in states of the stage per reset interval, and indicating means fed by said last named means operative to indicate the presence of an output potential therefrom which exceeds a predetermined level.

2. The combination with a recurrent signal source of a plurality of scale-of-two counter circuits connected in a cascaded chain and fed by said source, means operative to regularly reset said counter chain to a reference state at regular intervals large in comparison to the recurrence rate of said source, means including an integrator circuit fed by the last stage in said chain operative responsive to a change in state thereof to produce a direct potential output, and indicating means fed by said last named means for indicating the presence or absence of an output potential therefrom, thereby indicating whether said recurrent signal source is in accordance or below a particular harmonic order of said reset means; means including a second integrator fed by the first stage in said chain operative to produce a direct current potential output which varies in amplitude dependency upon the number of changes in states of said first stage per reset interval, and indicating means fed by said last named means operative to indicate the presence of an output potential therefrom which exceeds a predetermined level thereby indicating whether said recurrent signal source is in accordance or above a particular harmonic order of said reset means.

3. The combination with a recurrent signal source of a plurality of scale-of-two counter circuits connected in a cascaded chain and fed by said source, means operative to reset said counter chain to a reference state at regular intervals large in comparison to the recurrence rate of said source, means including an integrator fed by the first stage in said chain operative to produce a direct potential which varies in amplitude dependency upon the number of changes in states of the stage per reset interval, circuit means fed by said integrator circuit operative responsive to produce an output potential in dependency on the amplitude of said direct potential derived from said integrating means, and indicating means fed by said last named means operative to indicate the presence of an output potential therefrom which exceeds a predetermined level.

4. The combination with a recurrent signal source of a plurality of scale-of-two counter circuits connected in a cascaded chain and fed by said source, means operative to reset said counter chain to a reference state at regular intervals large in comparison to the recurrence rate of said source, means including an integrator circuit fed by the last stage in said chain operative responsive to a change in state thereof to produce a direct potential output, circuit means fed by said integrator circuit operative responsive to produce an output potential in accordance with the presence or absence of an output potential from said integrator circuit, indicating means for indicating the presence or absence of an output potential therefrom, thereby indicating whether said recurrent signal source is in accordance or below a particular harmonic order of said reset means; means including a second intergrator fed by the first stage in said chain operative to produce a direct potential which varies in amplitude dependency upon the number of changes in states of the first stage per reset interval, circuit means fed by said second integrator circuit operative responsive to produce an output potential in dependency on the amplitude of said direct potential derived from said second integrating means and indicating means fed by said last named means operative to indicate the presence of an output potential therefrom which exceeds a predetermined level thereby indicating whether said recurrent signal source is in accordance or above a particular harmonic order of said reset means.

5. The combination of a plurality of scale-of-two counter circuits connected in a cascaded chain, said chain having an input terminal for receiving a recurrent signal, means operative to reset said counter chain to a reference state at regular intervals large in comparison to the recurrence rate of said signal, means including an integrator fed by the first stage in said chain operative to produce a direct potential output which varies in amplitude dependency upon the number of changes in states of the stage per reset interval, and indicating means fed by said last named means operative to indicate the presence of an output potential therefrom which exceeds a predetermined level.

6. The combination of a plurality of scale-of-two counter circuits connected in a cascaded chain, said chain having an input terminal for receiving a recurrent signal, means operative to regularly reset said counter chain to a reference state at regular intervals large in comparison to the recurrence rate of said signal, means including an integrator circuit fed by the last stage in said chain operative responsive to a change in state thereof to produce a direct potential output, and indicating means fed by said last named means for indicating the presence or absence of an output potential therefrom, thereby indicating whether said recurrent signal is in accordance or below a particular harmonic order of said reset means; means including a second integrator fed by the first stage in said chain operative to produce a direct current potential output which varies in amplitude dependency upon the number of changes in states of said first stage per reset interval, and indicating means fed by said last named means operative to indicate the presence of an output potential therefrom which exceeds a predetermined level, thereby indicating whether said recurrent signal is in accordance or above a particular harmonic order of said reset means.

SAMUEL W. LICHTMAN.
DANIEL G. MAZUR.

REFERENCES CITED

The following references are of record in the file of this patent:

UNITED STATES PATENTS

| Number | Name | Date |
|---|---|---|
| 2,349,810 | Cook | May 30, 1944 |
| 2,389,275 | Rayner | Nov. 20, 1945 |